Oct. 10, 1961  H. PFLEUMER  3,003,192
METHOD FOR THE PRODUCTION OF CLOSED CELL RUBBER
Filed Feb. 24, 1958  2 Sheets-Sheet 1
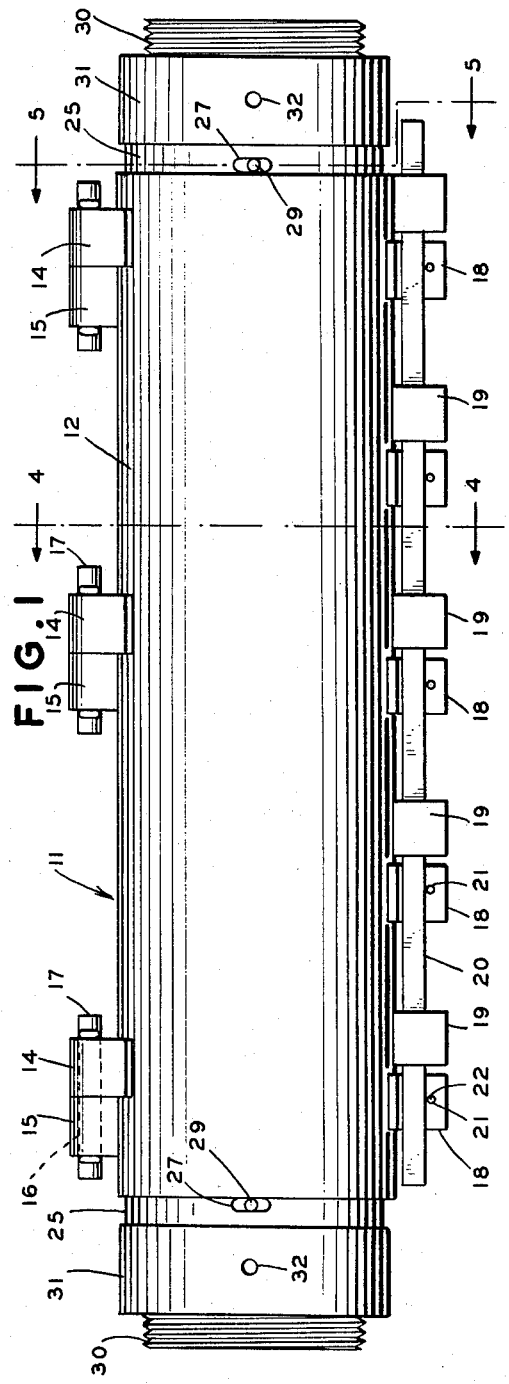
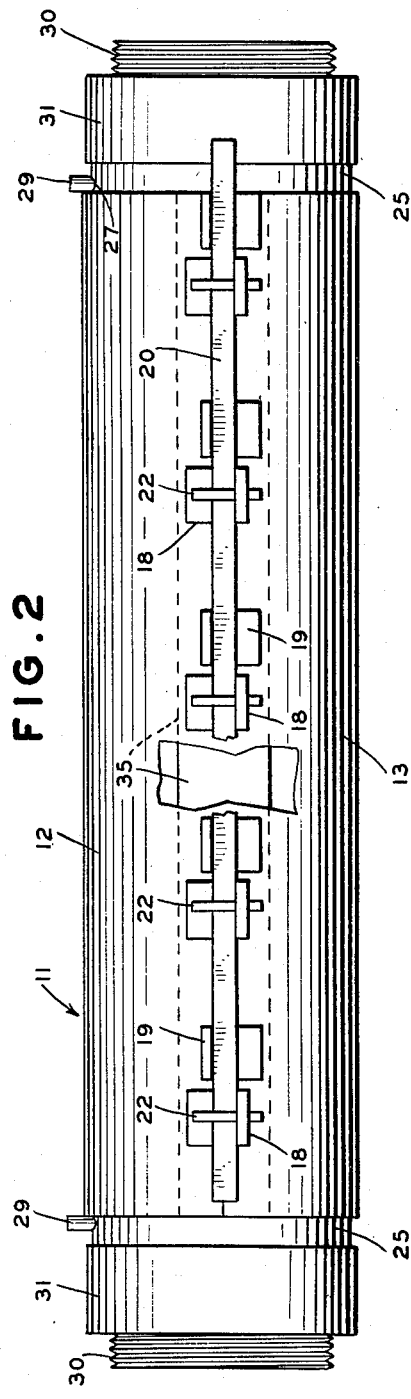

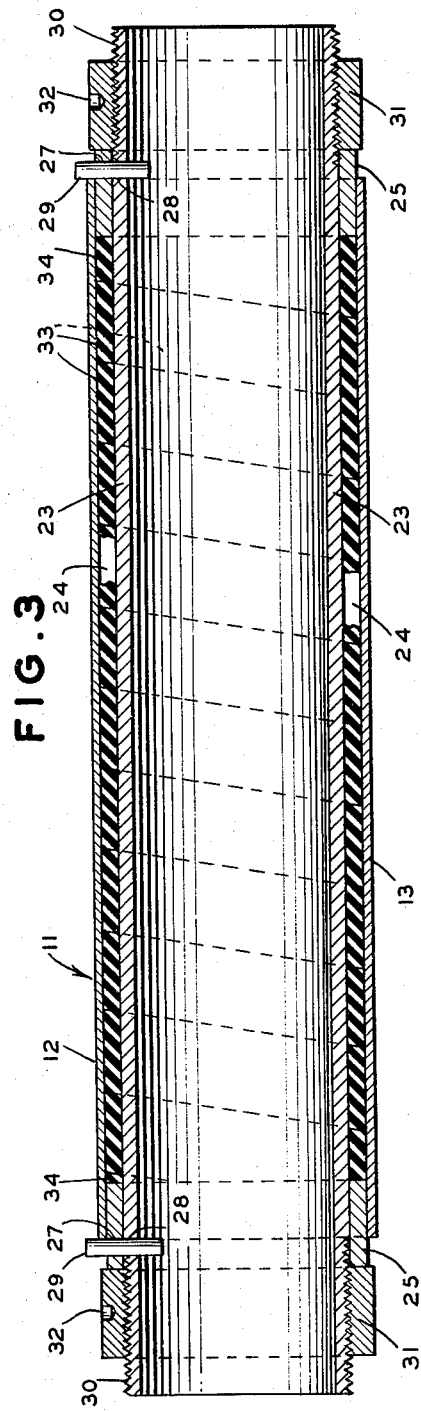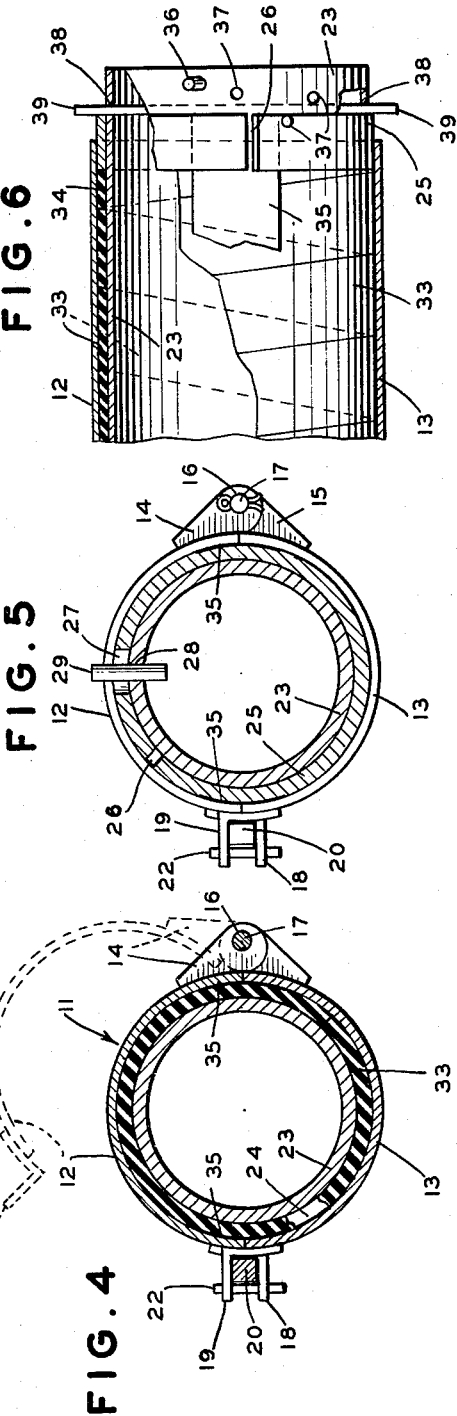

United States Patent Office 3,003,192
Patented Oct. 10, 1961

3,003,192
METHOD FOR THE PRODUCTION OF CLOSED CELL RUBBER
Hans Pfleumer, North Brunswick, N.J., assignor to Rubatex Products, Inc., New York, N.Y., a corporation of Delaware
Filed Feb. 24, 1958, Ser. No. 717,041
10 Claims. (Cl. 18—53)

The present invention relates to closed cell, gas expanded rubber, and particularly to a method for producing rubber of this type having a cell pressure greater than that of closed cell rubber produced by previous methods. The method of the invention is especially useful for the production of elongated strips of high pressure closed cell rubber suitable for use in the manufacture of puncture proof linings for pneumatic tires, shoe soles and similar articles.

It is well known in the manufacture of expanded rubber to incorporate in the rubber mix a substance or mixture of substances called a blowing agent which decomposes on heating to form a gas thus causing the rubber to expand. Many suitable chemical blowing agents are available; mixtures of nitrites and ammonium salts, such as sodium nitrite and ammonium acetate, which release nitrogen when heated, are especially satisfactory. Generally any suitable proportions of the gas-forming chemicals may be incorporated in the rubber compound, as determined by the extent of the expansion desired; sufficient blowing agent being added to liberate the desired volume of gas.

Closed cell, gas expanded rubber has previously been manufactured by blowing and vulcanizing a rubber compound in a platen press. In this process a platen or steel frame having a number of daylights or cavities is slightly overloaded, for example, with square or rectangular sheets of a solid rubber compound containing a chemical blowing agent. The hot press containing the loaded platen is then closed, molding the rubber to the volume of the cavities in the platen and squeezing or flashing the excess rubber out of the mold. This serves to provide a completely full mold; a condition essential for successful production of closed cell rubber. The solid rubber compound in the mold is substantially incompressible and has a high coefficient of thermal expansion. Therefore, when the rubber compound is heated by the hot press it exerts a tremendous pressure in the mold due to thermal expansion. This pressure is so great that it forces the mold open allowing an additional small amount of rubber to flash out. When this happens the internal pressure in the mold is dissipated briefly and the press is able to close the mold again. Continued heating of the solid rubber compound then decomposes the chemical blowing agent liberating gas and producing a cellular structure in the completely enclosed rubber. The cell pressure developed by the evolution of gas from the blowing agent on heating generally amounts to about 1,000 to 1,500 pounds per square inch, thus limiting the size of the sheets of closed cell rubber which may be produced in such presses due to the tremendous force per unit area required to keep the presses closed during the vulcanizing and blowing operation.

In the platen press method for making closed cell cellular rubber sheets, the platen press or mold is opened and the blown rubber sheets removed from the press immediately after the blow or liberation of gas, whereupon the rubber expands under the action of the gas. This process is subject to the disadvantage that the rubber is stressed during expansion on its release from the mold while it is still at a vulcanizing temperature and while the internally developed gas is hot and in an expanded state. These conditions result in an immediate and spontaneous overexpansion of the rubber, an overstressing of the rubber cell walls and a large loss of internal gas. Consequently the cellular rubber product is subject to immediate primary shrinkage and to secondary shrinkage taking place over a period of several weeks.

An improved platen press method for making cellular rubber sheets, which obviates these disadvantages, is described in my copending application Serial No. 307,221, filed August 30, 1952, and now abandoned. In this method a rubber compound containing a blowing agent is placed in a mold and heated to at least partially cure the rubber compound while allowing it to expand in the mold in one dimension. The amount of expansion permitted is such that the internal cell pressure is materially reduced. The expanded material in the mold is allowed to cool before the mold is opened and the product removed. Overexpansion of the rubber after the cure and loss of internal gas pressure are suppressed in this way.

In my United States Patent 2,769,205 there is illustrated an expanding mold for use in providing a double vulcanizing cycle. That is, the vulcanizing cycle is divided into two parts. During one half of the cycle and while the cell pressure is still low, the rubber is fully compressed; during the other half of the cycle the mold is expanded in the press to reduce the cell pressure. After the completion of the vulcanizing cycle, the mold is immediately opened and the hot rubber allowed to expand.

An improved method for making closed cell rubber, which entirely eliminates the heavy and costly platen presses, is described in my United States Patent 2,297,022. In general, this method comprises mixing a rubber compound with a chemical blowing agent, forming the mix into sheets which are wrapped around a cylindrical inner mold member and secured by means of sheet metal wrappings and binding straps, and placing the inner mold member with the rubber sheets and wrappings in an outer mold spaced therefrom. The mold is then heated to vulcanizing temperature causing decomposition of the blowing agent to produce gas and partial vulcanization of the rubber while preventing radial expansion of the rubber sheets by means of the bindings until a predetermined internal pressure is developed. This pressure is sufficient to break the bindings and expand the rubber sheets against the outer mold. Heating of the expanded rubber is then continued to complete the blowing and vulcanization operations.

Although the method and apparatus of United States Patent 2,297,022 provide closed cell rubber without resorting to the use of cumbersome and expensive platen presses it does not produce closed cell rubber having sufficiently high cell pressure for certain uses.

It is an object of the present invention, therefore, to provide an improved method for the production of closed cell rubber in a cylindrical mold which permits the production of rubber having a higher cell pressure than was previously obtainable.

It is another object of the invention to provide a method for the production of closed cell rubber which permits the use of larger amounts of blowing agent than was feasible previously thus permitting the production of high pressure closed cell rubber of relatively low density.

It is a further object of the invention to provide a method for producing elongated strips of closed cell rubber of increased cell pressure suitable for use as puncture proof linings in pneumatic tires.

In accordance with the invention a method is provided in which a rubber compound containing a chemical blowing agent is heated initially while confined in a mold expansible to accommodate the enlarged volume of the compound caused by thermal expansion. Thereafter, heating of the rubber compound is continued at vulcanizing temperature to decompose the blowing agent and liberate gas while preventing further enlargement in the volume of the mold. When the rubber is sufficiently cured, it is allowed to cool. The resulting closed cell rubber is then removed from the mold when sufficiently cool to avoid subjecting the cellular rubber to internal stresses sufficient to cause over expansion.

In a preferred embodiment of the invention the rubber compound is vulcanized and blown in the form of an elongated strip wound contiguously on a mandrel to make up a continuous cylindrical rubber surface which is clamped in an outer mold. Heat is then applied to the mold and the strip of rubber is allowed to expand laterally in the mold to the point where the thermal expansion of the rubber is substantially accommodated. The expansion of the mold is then stopped and heating is continued to vulcanize and chemically blow the rubber strip. When the strip is adequately cured, the mold is cooled to reduce the internal gas pressure in the resulting strip of closed cell rubber before the mold is opened. On opening the cooled mold the strip of high pressure closed cell rubber is easily unwound from the mandrel.

The closed cell rubber provided by the method of the present invention is superior, for certain purposes, to similar rubber previously available, due to its increased cell pressure. Desired cell pressures in excess of those previously feasible, for example as much as two atmospheres or more gauge pressure, are obtained by adjusting the amount of blowing agent employed. The increased amounts of blowing agent used also serve to provide more cell space per volume of rubber and therefore less dense closed cell rubber than has previously been available.

It is to be understood that the invention is not limited to natural rubber but is equally applicable to plastics and other synthetic products which may be used as rubber substitutes and which may be cured or set in an analogous way to natural rubber. Accordingly, the term "rubber," as used in the specification and claims herein, is intended to include such plastics and other synthetic materials.

The type of rubber sheet and strips involved in the present invention is described in greater detail in United States Patents 2,422,797; 2,421,831; 2,420,815; 2,374,233 and 2,335,649.

The invention will now be described in greater detail with reference to the accompanying drawings, in which:

FIG. 1 is a plan view of a cylindrical mold constructed in accordance with the invention;

FIG. 2 is a side elevational view of the mold of FIG. 1;

FIG. 3 is a longitudinal sectional view taken through the axis of the mold of FIG. 1;

FIG. 4 is a cross sectional view taken along the line 4—4 of FIG. 1;

FIG. 5 is a cross sectional view taken along the line 5—5 of FIG. 1; and

FIG. 6 is a partial longitudinal sectional view of a modified cylindrical mold constructed according to the invention.

Referring now to the drawings, and more particularly to FIGS. 1, 2 and 3 thereof, the cylindrical mold 11, which may conveniently be formed of steel or aluminum comprises two curved body members, a top 12 and a bottom 13. The top and bottom body members 12 and 13 are each provided with a number of hinges 14 and 15 respectively, fastened thereto and spaced along the rear longitudinal edge of each body member as viewed from the standpoint of FIGS. 1 and 2. The hinges 14 and 15 each have an axial bore 16 parallel to the longitudinal edge of the respective body member to which they are attached. The hinges 14 and 15 are spaced along the top 12 and bottom 13 body members respectively in such a way that when the body members are assembled as shown in the drawings each hinge 14 is placed adjacent to and aligned with a hinge 15. Each pair of adjacent hinges 14, 15 may be provided with its own individual hinge pin 17, which is inserted in the aligned bores 16 as shown in the drawings, or a single elongated hinge bar may be employed in common by the several pairs of hinges.

The forward longitudinal edge of the top 12 as seen in FIG. 2 is provided with a number of L-shaped lugs 18, fastened thereto by one leg of the L with the open part of the L upward, the other leg projecting outwardly from the curved top 12 parallel to the diameter of the circular cross section of the mold tangent to the forward edge of the top 12. The L-shaped lugs 18 are fastened to the top 12 in such a way that the leg of the L attached to the top follows the curvature of the top and projects beyond the forward edge thereof. Other L-shaped lugs 19 are similarly attached to the bottom 13 but with the open part of the L downward so that when the top 12 and bottom 13 are assembled and closed the L-shaped lugs 18 and 19 are placed adjacent to each other in pairs of lugs 18, 19, the protruding legs of which cooperate to form open passages. The passages formed by the pairs of lugs 18, 19 are aligned to receive a common lock bar 20 which rests on lugs 18 and which extends the length of the mold.

The lock bar may have any suitable cross section adapted to cooperate with complementary-shaped lugs such as 18, 19, to close the mold. The lock bar 20 shown in the drawings, for example, has a more or less square cross section which adapts the bar to slide between and separate the horizontal legs of the L-shaped lugs 18, 19 thus holding the top 12 and bottom 13 halves of the mold tightly together. The lock bar in another embodiment may suitably have a rectangular cross section such that the bar can be inserted in the passage formed by the lugs 18, 19, when the mold is closed with the longer sides of the rectangular cross section of the bar parallel to the horizontal legs of the lugs 18, 19. In order to close the mold more tightly a wrench or other suitable means may then be applied to the rectangular lock bar to turn it between the lugs 18, 19 so that the shorter sides of the rectangular cross section become parallel to the horizontal legs of the lugs thus placing the larger dimension of the cross section of the lock bar at right angles to the horizontal legs of the lugs and forcing the latter apart to tightly close the mold. Sections of the rectangular cross bar which engage the horizontal legs of the lugs 18, 19 when the bar is inserted therein may be beveled or otherwise cut away somewhat at one or more edges to facilitate turning of the rectangular bar between the lugs.

When a rectangular lock bar is employed which does not completely fill the passage way provided by the lugs 18, 19 and the bar is inserted near the outer ends of the horizontal legs of the lugs, there may be a tendency for the mold to open somewhat due to bending of the lugs under the influence of stress applied by the internal pressure in the mold. Any slight opening of the mold caused by spreading of the legs of the lugs in this manner can be eliminated by providing a channel bar or other suitable means to envelop the horizontal legs of lugs 18, 19 and prevent them from spreading apart.

The L-shaped lugs 18 connected to the top 12 may each be provided with a socket 21 adapted to receive a metal dowel 22 as shown in the drawings or if desired dowels 22 may be employed in only the lugs 18 at either end of the mold. The dowels 22 serve to retain the lock bar 20 between the pairs of lugs 18, 19.

As best illustrated in FIG. 3, a cylindrical mandrel 23, smaller in diameter and longer than the cylindrical mold composed of top 12 and bottom 13, is positioned in the mold to form an annular chamber 24. A cylindrical sleeve 25, adapted to slide onto the mandrel 23 is provided at each end of the mandrel to close the annular chamber 24. Each of the sleeves 25 may be provided with a lateral or spiral split 26 which permits the sleeve to slide onto the mandrel easily during assembly and yet allows the sleeve to be compressed to tightly grip the mandrel thereafter. The split 26 may be omitted from the sleeves 25, however, if other means are provided to insure a pressure tight seal between the sleeve and mandrel. For example, the sleeves and mandrel may be machined to provide a tight sliding fit. The sleeves 25 are also provided with one or more slots 27, positioned to be aligned with corresponding holes or slots 28 in the mandrel 23. One or more wooden dowels 29, adapted to be inserted through a slot 27 in sleeve 25 and a corresponding hole or slot 28 in the mandrel 23 are provided.

The slots 27 in sleeve 25 and the slots 28 in mandrel 23 are disposed in such a way as to place the sleeve 25 within the annular chamber 24 at a desired position when the wooden dowels 29 are inserted in these slots. When so positioned, the sleeves 25 at either end of the mandrel 23 close the annular chamber 24 and determine its initial volume.

As one means for closing the mold 11, the ends of the mandrel 23 which protrude from the open ends of the mold formed by top 12 and bottom 13, may be threaded externally at 30 to receive an internally threaded clamp ring 31. The clamp ring 31 may be provided with one or more sockets 32 adapted to receive pins or other means such as a spanner wrench (not shown) for turning the clamp rings onto the ends of the mandrel. The clamp rings are screwed onto the ends of the mandrel 23 to engage the sleeves 25 and drive them into the annular chamber 24 between the mandrel 23 and mold 11 consisting of top 12 and bottom 13.

A strip of rubber 33 is wound on the mandrel in a helix with successive turns contiguous to form a continuous surface, and squared off at the ends even with the inner ends of the sleeves 25. Alternatively, the apparatus may be provided with dummy end pieces 34, composed of rubber or other suitable material, adapted to fill the wedge shaped spaces between the edge of the rubber strip in the last full turn at each end of the mandrel and the edge of the sleeve 25 adjacent thereto.

A continuous sheet of rubber may be substituted for the strip 33. In any event the rubber 33 completely fills the annular chamber 24 at all times.

Elongated steel shims 35 are provided to be placed between the rubber surface on the mandrel and the longitudinal junctures formed between the edges of the top and bottom members 12 and 13 where they come together to form the external tube of the mold.

Another means of closing the mold 11 is illustrated in FIG. 6. In this apparatus, the threaded clamp ring 31 is replaced by one or, preferably, several metal dowels 36 adapted to be inserted in sockets 37 provided in the ends of the mandrel 23. The positions of the metal dowels 36 may be changed relative to the edge of the sleeve 25 by insertion in the sockets 37 disposed at differing distances from the end of the mandrel. In this modification of the invention slots 38 may be provided at various positions in opposite sides of the hollow mandrel to accommodate a wooden dowel 39 passing through the slots 38 and mandrel 23 to position the sleeve 25 thereon.

In carrying out the process of the invention a suitable rubber compound including a dispersed blowing agent is formulated and shaped into sheets by known methods. A representative compound has the following composition:

| Ingredient: | Parts by weight |
|---|---|
| Rubber | 100 |
| Zinc oxide | 5 |
| Whiting | 30 |
| Stearic acid | 3 |
| Process oil [1] | 10 |
| Zenite [2] | 2 |
| Retarder W [3] | 2 |
| Sulfur | 2 |
| Unicel N D [4] | 10 |

[1] Petroleum distillate fraction used as a plasticizing agent for rubber compounds.
[2] A rubber vulcanization accelerator, available from E. I. du Pont de Nemours & Co.
[3] Salicylic acid treated with paraffin oil used for control of vulcanization, available from E. I. du Pont de Nemours & Co.
[4] A blowing agent, 60% inert, 40% di-N-nitrosopentamethylenetetramine, available from E. I. du Pont de Nemours & Co.

This compound cures in about 20 minutes at 300° F. or in a somewhat longer time if cured by means of live steam, for example, at a lower temperature.

Briefly, the method of the invention comprises winding a strip of rubber compound, containing dispersed blowing agent, onto an elongated cylindrical mandrel, confining the rubber at each end of the wound area with means adapted to permit only sufficient lateral expansion of the rubber to accommodate its thermal expansion, enclosing this unit in a cylindrical mold in such a way that the rubber completely fills the space enclosed by the mold, mandrel and end-confining means before heating, heating the mold, for example, by placing it in a closed chamber into which live steam is introduced, allowing the rubber-filled space in the mold to increase in volume only enough to accommodate the thermal expansion of the rubber, thereafter continuing to heat the rubber at a vulcanizing temperature to decompose the blowing agent, thus generating gas to blow the rubber, while maintaining the volume of the mold constant, allowing the mold and rubber to cool when the rubber is adequately cured, and opening the mold to remove the resulting high pressure closed cell rubber only when the rubber is sufficiently cool to prevent it from being overexpanded by the gas trapped in the cells thereof.

More specifically a sheet of solid rubber compound of the desired thickness and containing blowing agent, may suitably be taken off a conventional calender, cut into strips of a suitable width and reeled on a spool where the strip is allowed to cool sufficiently to shrink the rubber somewhat and make it easier to handle. The strip of rubber or other material may be pulled through mica flour which adheres to the strip and serves to lubricate it. The rubber strip 33 obtained in this way is wound onto the mandrel 23 by any suitable means, preferably on the bias, in such a way that the edges of successive turns of the strip are firmly butted together. The rubber strip is thus wound on the mandrel 23 to completely cover the working area thereof and then cut away at each end to provide a straight edge lying in a plane perpendicular to the axis of the mandrel, which edge is adapted to be closely engaged at every point by the edge of one of the sleeves 25 circumscribing each end of the mandrel. A wooden dowel 29 is then inserted through at least one slot 27 in each sleeve 25 and a corresponding hole 28 in the mandrel to hold the sleeve in position against the edge of the rubber on the mandrel. Alternatively, the rubber strip 33 may be wound on the mandrel 23 as described until its outer edge first crosses the point at which the working surface of the mandrel ends. The strip 33 would then be cut off leaving a wedge shaped area of the working surface at each end of the mandrel which is not covered by rubber. These areas may then be filled by means of dummy end pieces 34 of the same thickness as the rubber strip 33.

The rubber strip 33 may also be replaced by a solid sheet of rubber which is wound on the mandrel to fill the working area thereof.

Rigid retaining means for the sleeves 25 are provided at each end of the mandrel 23. These means may take the form of threaded clamp rings 31 shown in FIGS. 1, 2 and 3, which may be screwed onto threads 30 on the mandrel until spaced a predetermined distance from the outer edges of the sleeves 25. Alternatively, one or more metal dowels 36 adapted to fit into sockets 37 in the mandrel may be provided at predetermined distances from the outer edges of the sleeves 25 as shown in FIG. 6.

The unit comprising the mandrel, wound with a layer of rubber engaged at its ends by sleeves 25 which are held in place by one or more wooden dowels 29 or 39 is then placed in the cylindrical mold 11 which is closed around the unit after insertion of the shims 35 by lowering hinged top 12 down over the unit cradled in the bottom 13. The cylindrical mold is then placed in or engaged by a clamping or vice means not shown in the drawings, if necessary, to aid in closing the mold over the rubber wrapped mandrel and sleeves 25. The lock bar 20 is then inserted between the pairs of L-shaped lugs 18, 19 which cooperate with the bar to tightly close and lock the mold. Metal dowels 22 are then inserted in the sockets 21 in the lugs 18 to hold the lock bar 20 in position. At this point the annular chamber 24 between the mandrel 23 and the cylindrical mold 11, composed of curved body members 12 and 13, and which is closed at each end by a split sleeve 25, is completely full of rubber, there being no free space in the annular chamber 24 whatsoever.

When the mold is full of rubber and closed tightly the top 12 and bottom 13 cooperate to grip and squeeze the sleeves 25 at each end of the mandrel 23 thus contracting the sleeves around the mandrel and providing tight closures at each end of the annular chamber 24.

The lateral expansion to be expected for the rubber, due to thermal expansion alone, is then calculated from the width of the rubber surface on the mandrel and its known coefficient of thermal expansion. The lateral expansion may of course be determined by trial and error if desired. In any event, the clamp rings 31 or metal dowels 36 are then positioned on the mandrel at a distance from the initial position of the outer edges of the sleeves 25 equal to the thermal expansion to be expected.

When this has been done the mold is ready for operation. The mold 11 is then heated by any suitable means. The preferred heating method is to place the entire mold in a closed chamber and heat it by the introduction of live steam. In this way the rubber in the mold is heated on both sides since the steam and heat are free to circulate through the hollow cylindrical mandrel as well as over the outside surface of the mold.

As the rubber in the mold is heated it begins to expand initially due to thermal expansion alone. As noted above in the discussion of the platen press methods of making closed cell rubber, this initial thermal expansion creates virtually irresistible force due to the incompressibility of solid rubber. Therefore, the sleeves 25 at the ends of the annular chamber 24 containing the rubber are forced by the expanding rubber against the wooden dowels 29 or 39, as the case may be, causing them to be sheared off. Thermal expansion continues until the rubber reaches its maximum volume, at the vulcanizing temperature employed, due solely to thermal expansion. When this volume is reached the sleeves 25 have been forced against the clamp rings 31 or metal dowels 36, as the case may be, and consequently further expansion of the annular chamber is prevented.

The annular chamber 24 has now reached its maximum volume and is completely filled with thermally expanded rubber compound. Continued heating of the mold at vulcanizing temperatures causes the decomposition of the blowing agent dispersed in the rubber with consequent evolution of gas. The evolved gas produces a cellular structure in the enclosed rubber, exerting pressures of 1000 to 1500 or more lbs. per square inch in the mold. Pressures of this order are not prohibitive in cylindrical molds of the present invention since the stresses are distributed over two cylinders, the mandrel and mold, which are better able to absorb stress than the rams used to close flat platen presses.

Heating of the mold is continued until the rubber compound is blown and cured to the desired extent. The mold and rubber are then cooled either by removing them from the source of heat or steam alone, by blowing air over the mold, or by any other suitable means. When the mold is sufficiently cool and the rubber has been allowed to set, the mold is opened and the strip of high pressure closed cell rubber is removed from the mandrel.

The internal pressure in the mold after completion of the vulcanizing and blowing operation may be such that it would be difficult to open the mold. When this is the case, clamping or vise means, such as that used to close the mold may be helpful in compressing the mold and thus relieving the pressure on the lock bar and allowing it to be withdrawn. In apparatus of the type shown in FIG. 6 it may also be desirable to provide means for compressing the ends of the mold by engaging the outer edges of the sleeves 25 to force the sleeves into the chamber 24 and relieve the pressure on metal dowels 36 allowing the latter to be withdrawn from the mandrel.

Closed cell cellular rubber produced by the method of the invention is superior for certain purposes to that previously available since it can be produced with an internal gas pressure in the cells of up to two or more atmospheres gauge pressure. Further the novel method and apparatus provide strips of closed cell rubber longer than can be cut from sheets of the size obtainable from practicable platen press molds. The invention also minimizes overstressing and overexpansion of the closed cell rubber, which is characteristic of platen press closed cell rubber, since the rubber is allowed to cool and set up firmly, and the hot expanded gases are allowed to cool before the protective restraint of the mold is removed from the product.

The production of closed cell rubber according to the new method in the cylindrical mold of the invention has substantial advantages over the use of platen presses in that the apparatus may be of lighter construction. For example, the mandrel may be composed of aluminum and the outer mold of sheet steel in the new apparatus whereas the platens in a press mold must be heavily constructed of cast iron or steel and be heavily ribbed so as not to bend under the pressure of the ram. Further, the new method permits cooling of the expanded rubber prior to release from the mold in an efficient economical manner. It is a simple matter to quickly exchange cylindrical molds in a steam chamber without loss of substantial quantities of heat whereas it is both time consuming and wasteful of heat to cool a platen press before opening the mold.

While the invention has been described in connection with specific embodiments thereof and in specific uses, it should be understood that it is not limited thereto, for various modifications will occur to those skilled in the art without departing from the spirit and scope of the invention as set forth in the claims.

What is claimed is:

1. The method of producing elongated strips of closed cell, cellular, gas expanded rubber from a rubber compound having dispersed therein a substance which, on the application of heat, generates a gas, which comprises the steps of winding a strip of rubber compound onto an elongated cylindrical mandrel having at its opposite ends sleeves slidable concentrically thereon, said strip of rubber compound being wound on said mandrel so that its opposite ends are in contact with said sleeves thereby forming a sheet like layer on said mandrel covering said mandrel between said sleeves, positioning said mandrel with said rubber compound wound thereon in a cylindrical mold means to encompass said mandrel, said rubber compound and at least a portion of the sleeve at each end of the mandrel to thereby form an annular mold cavity closely confining said sheet like layer of rubber compound, heating said mandrel and said confined rubber compound to a temperature sufficient to generate said gas and cure said rubber compound, said heat thermally expanding said confined rubber compound to force said pair of sleeves to slide axialy outward along said mandrel, means at the ends of said mandrel for stopping the axial movement of said sleeves to restrain said sleeves against further outward axial movement after said rubber compound is thermally expanded, maintaining said temperature for a sufficient period to generate said gas and to cure said rubber compound while restraining further expansion of said confined sheet like layer due to the evolution of said gas in said strip of rubber compound, thereafter cooling the cured strip of rubber, and removing said cylindrical mold means encompassing said mandrel to permit the resultant strip of cured, closed cell, cellular rubber to expand under the pressure of gas trapped therein.

2. The method of producing closed cell, cellular, gas expanded material which comprises the steps of preparing a mix of thermally expansible curable material having dispersed therein a susbtance which, on the application of heat, generates a gas, subjecting said mix to a temperature sufficient to thermally expand said material, after said material has been thermally expanded confining said thermally expanded material against further expansion while subjecting said material to a temperature sufficient to generate a gas from said substance in said material to form closed gas cells in said material and to cure said material, while continuing to confine said material cooling the resulting gassed and cured closed cell, cellular material and, thereafter, permitting the cooled, cured closed cell, cellular material to expand by releasing it from confinement.

3. The method of producing closed cell, cellular, gas expanded material which comprises the steps of preparing a mix of a thermally expansible curable material having dispersed therein a substance which, on the application of heat, generates a gas, forming said mix into a shaped mass, closely confining said shaped mass, heating the confined mass to a temperature sufficient to thermally expand said shaped mass, with said shaped shaped mass thermally expanded and while preventing further expansion, heating the thermally expanded shaped mass to a temperature sufficient to generate gas from said substance and to cure said shaped mass, said gas forming a cellular structure of closed gas cells throughout said shaped mass and said heat being continued for a period sufficient to cure said material and, thereafter, while preventing expansion, cooling the cured material and, after said material is cooled, permitting the resulting cooled, cured, closed cell cellular material to expand under the pressure of the gas therein.

4. The method of producing closed cell, cellular, gas expanded rubber which comprises the steps of preparing a thermally expansible rubber compound having dispersed therein a substance which, on the application of heat, generates a gas, forming said compound into a shaped mass, closely confining said shaped mass, heating the confined mass to a temperature sufficient to thermally expand said shaped mass, with said shaped mass thermally expanded and while preventing further expansion, heating the thermally expanded shaped mass to a temperature sufficient to generate gas from said substance and to cure said shaped mass, said gas forming a cellular structure of closed gas cells throughout said shaped mass and, after said shaped mass has been cured and while preventing expansion, cooling the cured shaped mass and, after said shaped mass is cooled, permitting the resulting cooled, cured, shaped mass to expand under the pressure of the gas in the cellular structure therein.

5. The method of producing a sheet of closed cell, cellular, gas expanded rubber which comprises the steps of closely confining a sheet of thermally expansible rubber compound having dispersed therein a substance which, on the application of heat, generates a gas heating the confined sheet of rubber compound to a temperature sufficient to thermally expand said confined sheet, which said sheet thermally expanded and while preventing further expansion, heating the thermally expanded sheet to a temperature sufficient to generate gas from said substance and to cure said sheet, said gas forming a cellular structure of closed gas cells throughout said sheet, after said gas has been generated and said sheet has been cured and while preventing expansion of said sheet, cooling the cured sheet and, after and said cured sheet has been cooled, permitting the resulting cooling, cured sheet to expand under the pressure of the gas therein.

6. The method of producing an elongated strip of closed cell, cellular, gas expanded rubber which comprises the steps of winding a strip of thermally expansible rubber compound onto a form with the edges of successive turns of said strip in contact to form a sheet-like layer thereon, said rubber compound having dispersed therein a substance which, on the application of heat, generates a gas, closely confining said sheet-like layer of rubber compound, heating said confined rubber compound to a temperature sufficient to thermally expand said compound, with said compound thermally expanded and while preventing further expansion, heating the thermally expanded compound to a temperature sufficient to generate gas from said substance and to cure said compound, said gas forming a cellular structure of closed gas cells throughout said compound, continuing said heat until said compound is cured and, after said gas has been generated in said compound and said compound has been cured, cooling the cured material while preventing further expansion, and, after said material is cooled, permitting the resulting cooled, cured, compound to expand under the pressure of the gas in the closed cell, cellular structure therein.

7. The method of making a sheet of closed cell gas expanded material comprising the steps of placing a thermally expansible material in a cylindrical mold, said thermally expansible material having a chemical blowing agent finely dispersed therein, heating the mold to thermally expand said material, after said material is thermally expanded, confining said material against further expansion and heating said mold to generate gas from said blowing agent, while continuing to confine said material against further expansion, continuing the heating of said mold until said gas has been generated and said material has been cured, while continuing to confine said material against expansion, cooling the cured and blown material and, thereafter, releasing said cooled material from the mold to permit said material to expand under the pressure of the gas trapped therein.

8. The method of claim 7 in which the thermally expansible material is placed in the mold in the form of a strip.

9. The method of claim 7 in which the thermally expansible material is a rubber compound.

10. The method of claim 7 in which heat is supplied by means of steam.

References Cited in the file of this patent

UNITED STATES PATENTS

| | | |
|---|---|---|
| 1,461,929 | Monroe | July 17, 1923 |
| 1,574,658 | Johnston | Feb. 23, 1926 |

(Other references on following page)

UNITED STATES PATENTS

| | | |
|---|---|---|
| 1,806,300 | Lemming | May 19, 1931 |
| 2,026,996 | Raflovich | Jan. 7, 1936 |
| 2,283,316 | Cooper et al. | May 19, 1942 |
| 2,297,022 | Pfleumer | Sept. 29, 1942 |
| 2,395,293 | Pfleumer | Feb. 19, 1946 |
| 2,404,636 | Humphrey | July 23, 1946 |
| 2,497,914 | Sawyer | Feb. 21, 1950 |
| 2,537,089 | Rempel | Jan. 9, 1951 |
| 2,713,699 | Pooley | July 26, 1955 |